United States Patent [19]

Leonhardt

[11] 4,191,353
[45] Mar. 4, 1980

[54] PEDESTAL FOR SUPPORTING A SWIVEL SEAT IN A VEHICLE

[75] Inventor: Robert F. Leonhardt, Roscoe, Ill.

[73] Assignee: Atwood Vacuum Machine Company, Rockford, Ill.

[21] Appl. No.: 929,348

[22] Filed: Jul. 31, 1978

[51] Int. Cl.² ............................................. F16M 13/00
[52] U.S. Cl. ..................................... 248/425; 308/165
[58] Field of Search ............... 248/349, 425; 211/163; 297/349; 308/135, 163, 164, 165, DIG. 7, DIG. 9

[56] References Cited

U.S. PATENT DOCUMENTS

| 2,876,051 | 3/1959 | Fox ................................. 248/425 X |
| 3,570,800 | 3/1971 | Cycowicz ........................ 248/425 X |
| 3,572,817 | 3/1971 | Colautti .......................... 248/425 X |
| 3,593,954 | 7/1971 | Ritchie ............................... 248/425 |

FOREIGN PATENT DOCUMENTS 601526  7/1960  Canada ..................................... 248/349

Primary Examiner—William H. Schultz
Attorney, Agent, or Firm—Leydig, Voit, Osann, Mayer & Holt, Ltd.

[57] ABSTRACT

A seat is supported in a vehicle by a swivel platform which is clamped to a base in such a manner as to be free to turn but which, at the same time, is tied to the floor of the vehicle by straps so as to prevent the platform from pulling loose from the base during a collision. An axially slit and radially split bearing ring supports the platform for turning on the base.

13 Claims, 10 Drawing Figures

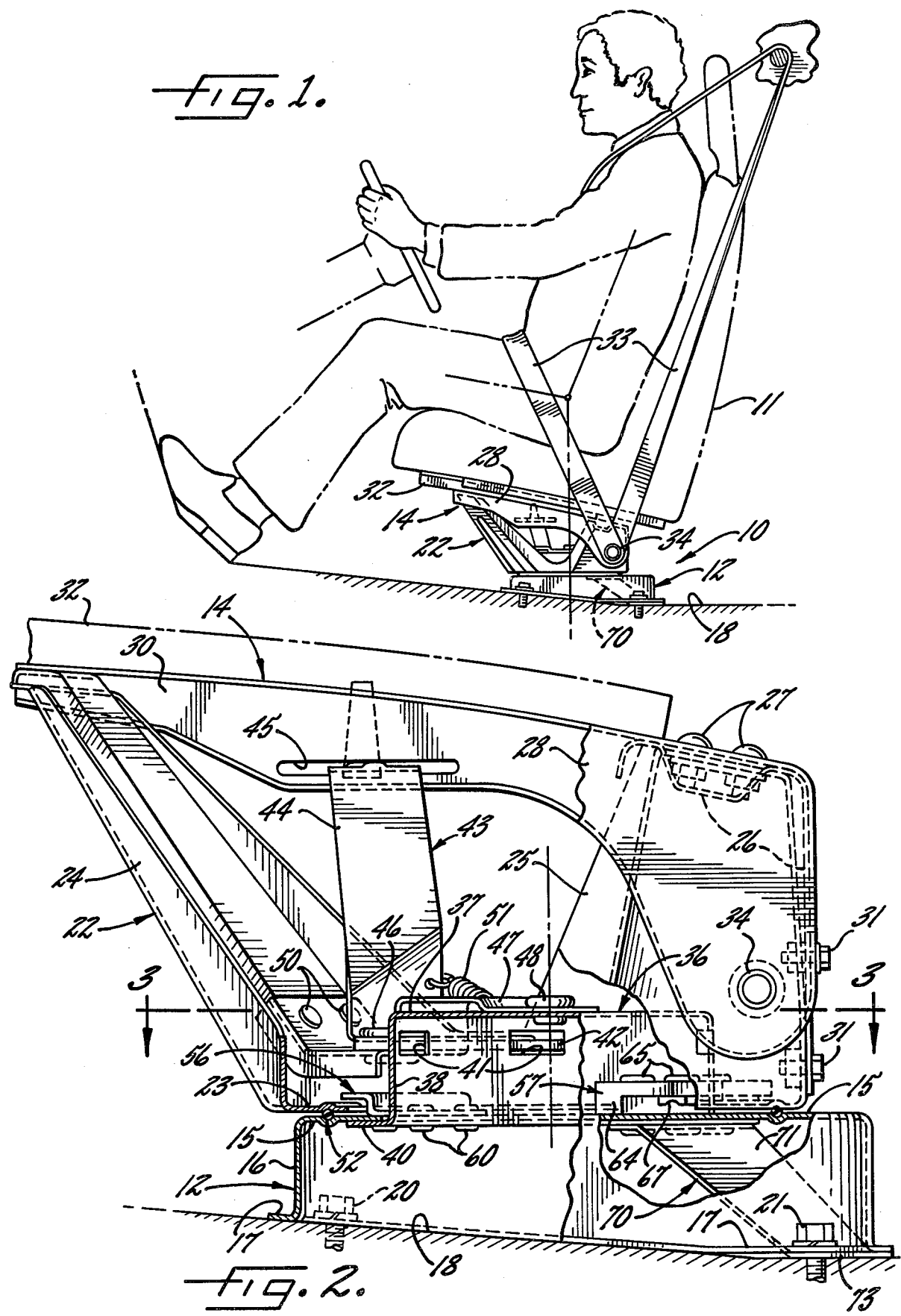

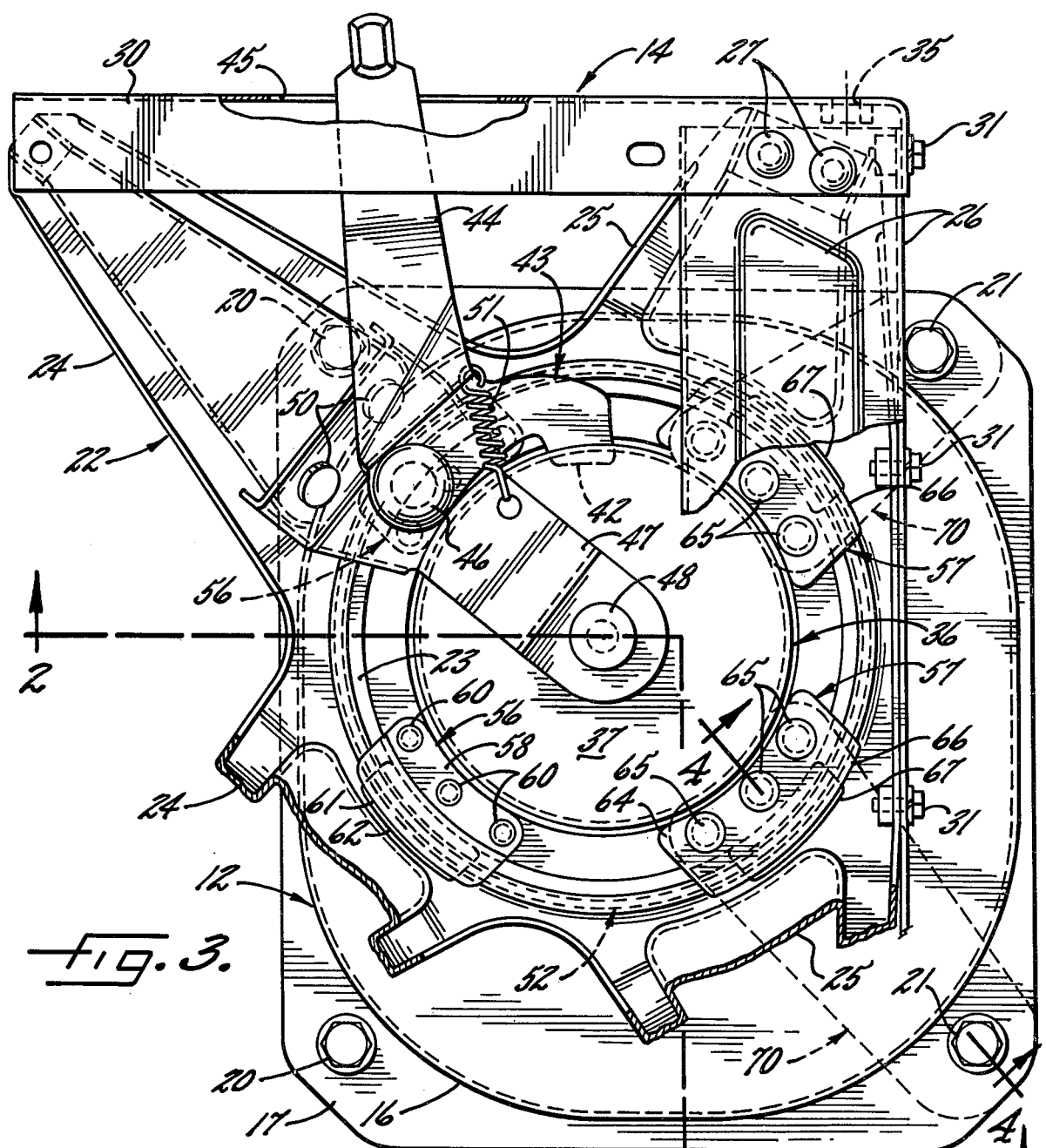
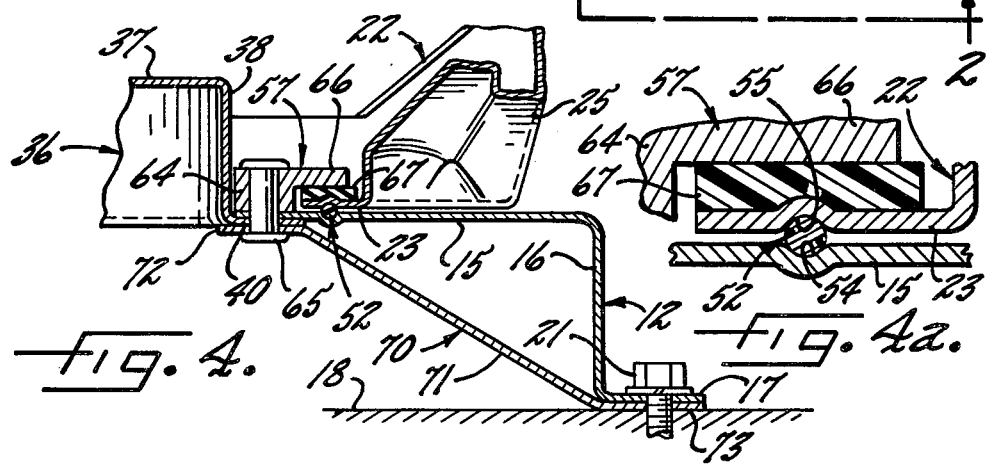

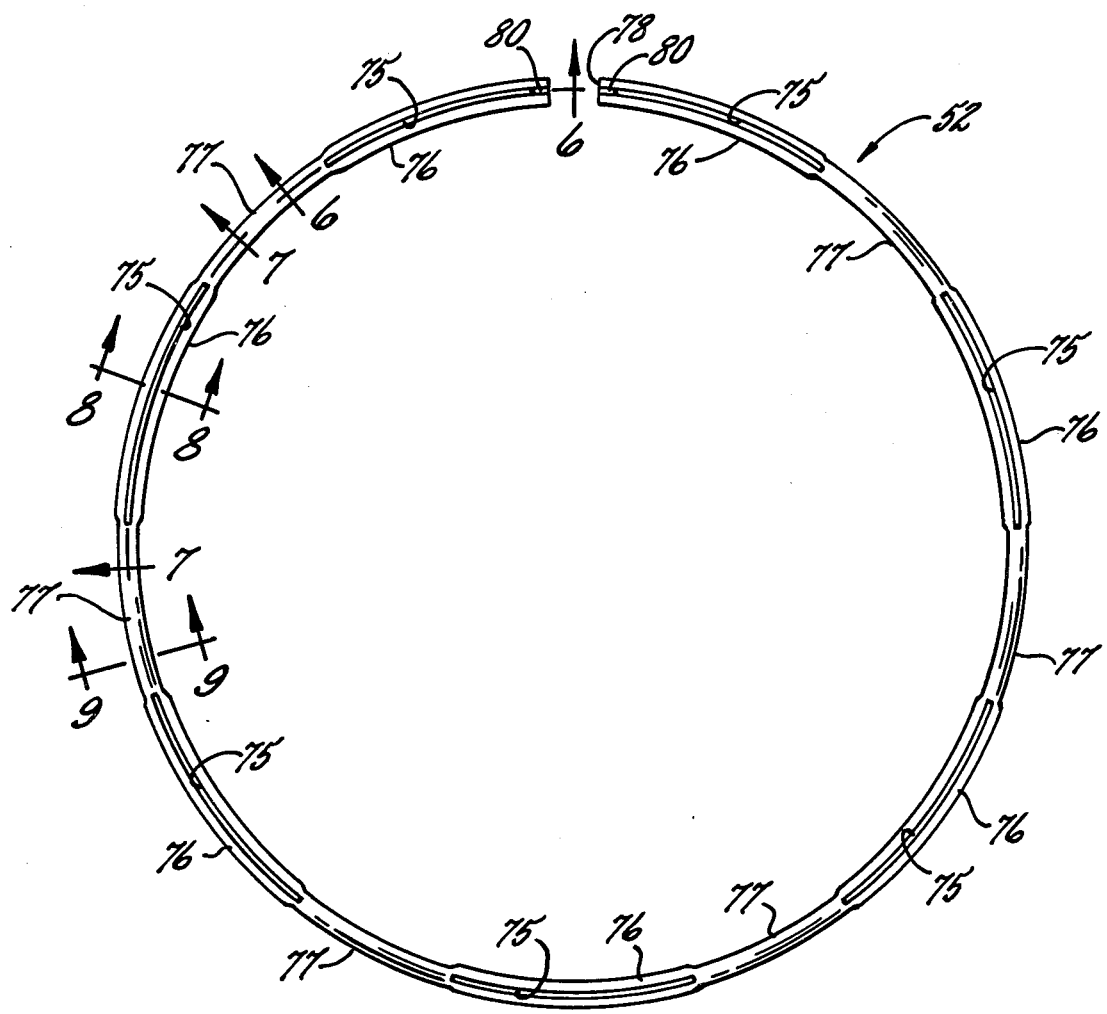
fig. 5.
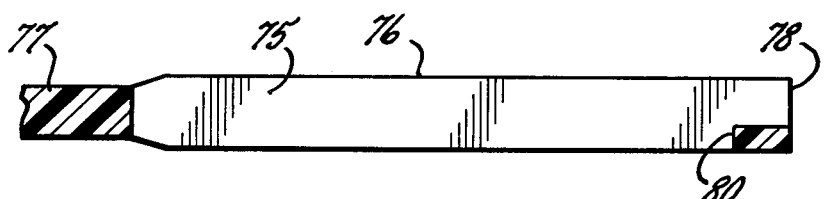
fig. 6.
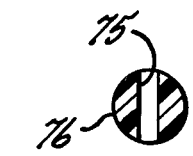
fig. 8.
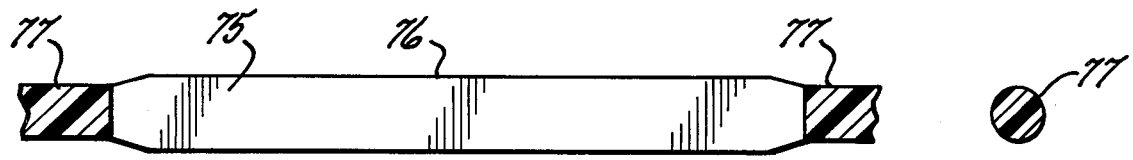
fig. 7.
fig. 9.

PEDESTAL FOR SUPPORTING A SWIVEL SEAT IN A VEHICLE

BACKGROUND OF THE INVENTION

This invention relates to a pedestal for mounting a seat in a vehicle. More particularly, the invention relates to a pedestal which is adapted to be anchored to the floor of the vehicle and which is adapted to mount the seat for turning about an upright axis so that the seat may be swivelled between different positions. Swivel seats are commonly used in trucks, vans, recreational vehicles and the like.

Pedestals for swivel seats usually comprise a base adapted to be anchored to the vehicle floor and adapted to rotatably support a member which serves a mounting platform for the seat. The safety harness for strapping the occupant in the seat is attached to the swivel platform and is adapted to swivel with the seat.

Existing federal safety regulations require that the pedestal be able to withstand a very severe pull test which simulates the upward and forward force imposed on the pedestal by the safety harness during impact. In order for the pedestal to pass the test, the base must remain anchored to the vehicle floor when subjected to the specified force and, in addition, the swivel platform must not pull upwardly and forwardly from the base by more than a designated distance. To meet the safety regulations, prior pedestals have been made from heavy materials and by expensive manufacturing procedures. As a result, such pedestals are both high in cost and high in weight.

SUMMARY OF THE INVENTION

The general aim of the present invention is to reduce the cost and weight of a swivel pedestal by making the primary components of the pedestal out of easy-to-fabricate and relatively light weight sheet metal parts which are uniquely arranged to enable the swivel platform to remain attached to the base when the pedestal is subjected to the required pull test.

Another object is to reduce the ability of the swivel platform to separate from the base by tying the platform to the vehicle floor while still permitting the platform to swivel on the base.

In a more detailed sense, the invention resides in the provision of novel straps which extend upwardly from the vehicle floor to clamps for holding the platform on the base and which reinforce the clamps when the pedestal is subjected to a pull test.

A further object of the invention is to provide a simple and low cost bearing between the base and the platform, the bearing being characterized by its ability to accommodate wide manufacturing tolerances in the bearing surfaces of the base and the platform.

The invention also resides in the provision of a bearing in the form of a resiliently yieldable ring having circumferentially extending slits and in the novel configuration of the ring.

These and other objects and advantages of the invention will become more apparent from the following detailed description when taken in conjunction with the accompanying drawings.

BRIEF DESCRIPTION OF THE DRAWINGS

FIG. 1 is a side elevational view of a new and improved pedestal incorporating the unique features of the invention, the pedestal being shown in conjunction with an exemplary swivel seat.

FIG. 2 is an enlarged side elevational view of the pedestal illustrated in FIG. 1 with certain parts of the pedestal being broken away and shown in section as taken substantially along the line 2—2 of FIG. 3.

FIG. 3 is a top plan view of the pedestal illustrated in FIG. 2 with certain parts of the pedestal being broken away and shown in section as taken substantially along the line 3—3 of FIG. 2.

FIG. 4 is a fragmentary cross-section taken substantially along the line 4—4 of FIG. 3.

FIG. 4a is an enlarged view of parts shown in FIG. 4.

FIG. 5 is a top plan view of the bearing for supporting the swivel platform on the base.

FIGS. 6, 7, 8 and 9 are enlarged cross-sections taken substantially along the lines 6—6, 7—7, 8—8 and 9—9, respectively, of FIG. 5.

DETAILED DESCRIPTION OF THE PREFERRED EMBODIMENT

As shown in the drawings for purposes of illustration, the invention is embodied in a pedestal 10 for supporting a vehicle seat 11 for turning or swivelling between different positions about an upright axis. The pedestal which has been illustrated supports the seat on the driver's side of the vehicle but, with minor modifications, the pedestal can be used to support the seat on the passenger's side.

In general, the pedestal 10 comprises a base 12 and a swivel platform 14 mounted to turn on the base. The base is made of sheet metal and has a shape similar to that of an inverted dish. Thus, the base includes a top wall 15 (FIG. 2) and an annular side wall 16 formed integrally with and depending from the top wall. A peripheral flange 17 extends outwardly from the lower margin of the side wall 16 and is adapted to be anchored rigidly to the floor 18 of the vehicle by a pair of forward bolts 20 and a pair of rear bolts 21.

The swivel platform 14 also is made of sheet metal and is defined in part by a one-piece spider 22 located above the top wall 15 of the base 12. Herein, the spider is formed by a lower annulus 23 (FIGS. 2 and 4a), by a pair of upwardly projecting forward legs 24 and by a pair of upwardly projecting rear legs 25. A sheet metal cross piece 26 (FIG. 3) of inverted L-shape cross-section spans the rear legs 25 of the spider and is secured to the upper ends thereof by suitable fasteners 27. Sheet metal side pieces 28 and 30 extend between the two pairs of front and rear legs 24 and 25. Each side piece is secured to the cross piece 26 and to the upper end of the associated rear leg 25 by the fasteners 27 and is secured to its associated front leg 24 by additional fasteners (not shown). Still other fasteners 31 are used to join the cross piece 26, the side pieces 28 and 30 and the rear legs 25 of the spider 22. As a result, the platform 14 constitutes a very strong and rigid unit in spite of the fact that it is made from relatively light weight and easy-to-fabricate sheet metal components.

Fore-and-aft extending seat adjusting tracks 32 (FIGS. 1 and 2) are secured to the upper sides of the two side pieces 28 and 30 and serve to support the seat 11 for selective back and forth movement. In addition, the side pieces serve to anchor the safety harness 33 which is used to strap the driver in the seat 11. The ends of the lap and shoulder belts are rigidly anchored to the lower rear portion of the side piece 28 as indicated at 34 in FIG. 1. A similarly located point 35 (FIG. 3) serves as the other anchor point for the belts.

As shown in FIGS. 2 and 4, a sheet metal drum 36 is rigid with the top wall 15 of the base 12 and projects upwardly through a hole in the top wall and through the hole in the annulus 23 of the spider 22. The drum is in the shape of an inverted dish and includes a top wall 37, a depending side wall 38 and a peripheral flange 40 which projects outwardly from the lower margin of the side wall in underlying relation with the top wall 15 of the base 12.

Two angularly spaced openings 41 (FIG. 2) are formed in the side wall 38 of the drum 36 and are adapted to receive a pawl 42 (FIG. 3) which serves to releasably latch the seat 11 and the platform 14 in a fixed angular position on the base 12. The pawl 42 constitutes part of a latching lever 43 having an upwardly projecting handle 44 whose free end extends through a slot 45 (FIG. 2) in the side piece 30 so as to be accessible to the driver. The latching lever is mounted to pivot about an upright pin 46 (FIG. 3) which is supported on a radially extending arm 47 having one end riveted at 48 to the top wall 37 of the drum 36 and having its opposite end riveted at 50 to one of the front legs 24 of the spider 22. A contractile spring 51 is stretched between the lever 43 and the arm 47 and urges the lever clockwise (FIG. 3) about the pin 46 to a latching position in which the pawl 42 enters one of the openings 41 in the drum 36 to hold the seat 11 and the platform 14 in a fixed angular position on the base 12. By manually pivoting the lever in a counterclockwise direction, the pawl may be retracted out of the opening to permit turning of the platform.

The platform 14 is supported to turn on the base 12 by an anti-friction bearing ring 52 (FIGS. 4a and 5) whose detailed construction will be described subsequently. As shown in FIG. 4a, the bearing ring 52 is captivated in an annular race which is defined by opposed circumferentially extending grooves 54 and 55 formed in the base 12 and the platform 14, respectively. The groove 54 is formed in the upper side of the top wall 15 of the base 12 and opens upwardly while the groove 55 is formed in the lower side of the annulus 23 of the spider 22 and opens downwardly. The ring 52 is made from anti-friction material and holds the platform 14 out of metal-to-metal contact with the base 12 when the platform is turned.

In accordance with one aspect of the present invention, the platform 14 is clamped to the bearing 52 in such a manner as to permit the platform to turn and yet the platform is tied to the vehicle floor 18 itself so as to prevent the platform from separating from the base 12 if the vehicle is involved in a severe collision and a large upwardly and forwardly directed force is exerted on the platform through the harness anchor points 34 and 35. By virtue of the platform 14 being tied to the vehicle floor 18, the pedestal 10 is capable of meeting existing federal safety regulations even though the major components of the pedestal are made of relatively light weight and inexpensive sheet metal which, by itself, does not possess extremely high strength.

More specifically, the platform 14 is held downwardly against the bearing ring 52 by two angularly spaced front clamps 56 and by two angularly spaced rear clamps 57 (FIG. 3). The two front clamps are made of sheet metal and each includes a mounting flange 58 which is secured to the top wall 15 of the base 12 by three rivets 60, the rivets also extending through the flange 40 of the drum 36 and serving to anchor the drum to the base 12. Each front clamp also includes a clamping portion 61 whose lower face rigidly supports a pad 62 of anti-friction material such as Delrin. Each pad overlies and slidably engages the upper side of the annulus 23 of the spider 22 and is formed with a downwardly opening and circumferentially extending groove which receives and accommodates the raised hump formed in the upper side of the annulus above the groove 55.

Each rear clamp 57 is formed from a relatively massive block of hardened steel and includes a mounting portion 64 (FIG. 4) which is secured rigidly to the top wall 15 of the base 12 by three rivets 65 which also extend through the flange 40 of the drum 36. A clamping portion 66 is formed integrally with and projects radially outwardly from the mounting portion 64 of each rear clamp 57 and overlies the upper side of the annulus 23 of the spider 22. Secured rigidly to the lower face of each mounting portion is a Delrin bearing pad 67 disposed in sliding engagement with the annulus 23 and formed with a downwardly opening and circumferentially extending groove for accommodating the hump defined in the annulus above the groove 55 (see FIG. 4a).

The front and rear clamps 56 and 57 serve to hold the annulus 23 of the spider 22 downwardly against the bearing ring 52 and also prevent radial shifting of the spider. By virtue of the anti-friction pads 62 and 67, however, the spider is free to turn relative to the clamps.

In carrying out the invention, the two rear clamps 57 are tied directly to the vehicle floor 18 by reinforcing straps 70 (FIGS. 2, 3 and 4). As a result of the straps, any upwardly and forwardly directed force which might be exerted on the rear clamps by the annulus 23 of the spider 22 is transmitted to and is resisted by the floor 18 and thus the floor serves as an anchor to prevent the seat 11 and the platform 14 from being pulled loose from the base 12.

As shown in FIG. 4, the straps 70 are housed within the rear portion of the base 12 and each includes a body portion 71 which is inclined downwardly and rearwardly from the respective rear clamp 57. Formed integrally with the upper end of the body 71 of each strap 70 is a generally horizontal tongue 72 which lies against the underside of the flange 40 of the drum 36. The tongues 72 are secured rigidly with respect to the mounting portions 64 of the rear clamps 57 by the rivets 65. A generally horizontally extending tongue 73 also is formed integrally with the lower end of the body 71 of each strap 70. The tongues 73 are sandwiched between the floor 18 and the flange 17 of the base 12 and are formed with holes which receive the rear mounting bolts 21 of the base. Thus, the straps 70 tie the rear clamps 57 directly to the floor 18 and serve as braces to prevent the clamps from releasing the annulus 23 of the spider 22 if a collision occurs and a large upwardly and forwardly directed force is exerted on the platform 14 through the anchor points 34 and 35.

According to another aspect of the invention, the bearing ring 52 is constructed in a unique manner to enable the ring to conform to and seat within the race defined by the grooves 54 and 55 even though the grooves may have varying dimensions and may be imperfectly shaped as a result of being formed in the sheet metal components by a stamping operation. Thus, the bearing ring 52 avoids the need for holding precise manufacturing tolerances and avoids the need of machining the grooves 54 and 55.

In the present instance, the bearing ring 52 is made of Delrin and thus is relatively hard but yet is resiliently yieldable. To enable the ring to conform to the grooves 54 and 55, axially extending slits 75 (FIGS. 5 to 8) are formed in the ring and increase the radial yieldability thereof. The slits open out of at least the top side of the ring and preferably extend vertically through the entire cross-sectional diameter of the ring as shown in FIGS. 6 and 8.

The slits 75 are formed in several angularly spaced ring sections 76 having a relaxed cross-sectional diameter which is somewhat greater than the cross-sectional diameter of the race defined by the grooves 54 and 55. The sections 76 are formed integrally with and thus are connected by intervening sections 77 (FIGS. 5 and 9) which are not slit and which have a cross-sectional diameter substantially less than the cross-sectional diameter of the race. While the ring may be continuous, it preferably is split radially as indicated at 78 in FIG. 5 to increase the hoopwise flexibility of the ring. The radial split 78 is located between two adjacent axially slitted sections 76 and, as shown in FIG. 6, the bottom of the slit 75 in the free end of each such section is closed by a small bridge 80.

When the ring 52 is placed in the grooves 54 and 55, the axially slitted sections 76 are flexed radially since the relaxed cross-sectional diameter of such sections is less than the cross-sectional diameter of the race defined by the grooves. The slits 75 enable the sections 76 to flex radially and yet insure that the bearing surfaces of the ring remain in contact with the bearing surfaces of the grooves 54 and 55 even though the dimensions of the grooves vary through a relatively wide range of tolerances. In addition, the radial split 78 permits the ring to seat circumferentially in the grooves even though the two grooves are not perfectly circular or concentric. Accordingly, the axial slits 75 and the radial split 78 enable the ring to "breathe" and thus conform to and establish good contact with the grooves 54 and 55 without excessive binding. Moreover, the danger of binding is reduced further by virtue of the sections 77 of small cross-sectional diameter since such sections do not frictionally engage the bearing surfaces of the grooves.

I claim:

1. A pedestal adapted to be anchored to the floor of a vehicle and adapted to support a vehicle seat for turning about an upright axis, said pedestal comprising a stationary base having a lower side adapted to be positioned on the vehicle floor, a platform for supporting the seat and located on the upper side of said base, a bearing between the upper side of said base and the lower side of said platform and mounting said platform to turn on said base and about an upright axis, a clamp secured to the upper side of said base and holding said platform downwardly against said bearing, a tie strap having an upper end connected to said clamp, and means for anchoring the lower end of said strap rigidly to the vehicle floor.

2. A pedestal adapted to be anchored to the floor of a vehicle and adapted to support a vehicle seat for turning about an upright axis, said pedestal comprising a stationary base having the shape of an inverted dish, a flange extending around the lower side of said base and adapted to be positioned on the vehicle floor, a platform for supporting the seat and located on the upper side of said base, a bearing between the upper side of said base and the lower side of said platform and mounting said platform to turn on said base and about an upright axis, first and second angularly spaced clamps secured to the upper side of said base and holding said platform downwardly against said bearing, first and second angularly spaced tie straps located within said base and having upper ends connected to the respective clamps, said straps having lower ends lying against said flange, and means for anchoring said flange and the lower ends of said straps rigidly to the vehicle floor.

3. A pedestal as defined in claim 2 in which said clamps are spaced angularly from one another around the rear side of said base, said straps being inclined downwardly and rearwardly from said clamps.

4. A pedestal as defined in claim 3 in which the lower ends of said straps are disposed in underlying relation with said flange, said means comprising bolts extending through said flange and the lower ends of said straps.

5. A pedestal as defined in claim 3 and further including a drum projecting upwardly from said base and having at least two angularly spaced openings therein, a latch carried on said platform and adapted to be received selectively in said openings to hold said platform in fixed angular positions on said base, said drum having a lower flange located adjacent the upper side of said base, and fasteners extending through said clamps, the upper side of said base, the flange on said drum and the upper ends of said straps.

6. A pedestal as defined in claim 2 in which the upper side of said base is formed with a circumferentially extending groove which opens upwardly, said platform being formed with a circumferentially extending groove which opens downwardly and which is disposed in overlying relation with the groove in said base whereby said grooves coact with one another to define a bearing race, said bearing comprising a ring made of resiliently yieldable material disposed in said grooves, and circumferentially extending slits opening upwardly out of the upper side of said ring and spaced angularly around said ring.

7. A pedestal as defined in claim 6 in which said ring is defined by angularly spaced first sections having a cross-sectional diameter corresponding substantially to the cross-sectional diameter of said bearing race, said slits being formed in said first sections, said ring further being defined by intervening second sections having a cross-sectional diameter which is substantially less than the cross-sectional diameter of said first sections.

8. A pedestal adapted to be anchored to the floor of a vehicle and adapted to support a vehicle seat for turning about an upright axis, said pedestal comprising a stationary base having a lower side adapted to be positioned on the vehicle floor, a platform for supporting the seat and located on the upper side of said base, the upper side of said base being formed with a circumferentially extending groove which opens upwardly, said platform being formed with a circumferentially extending groove which opens downwardly and which is disposed in overlying relation with the groove in said base whereby said grooves coact to define a bearing race, a ring made of resiliently yieldable material disposed in said grooves and supporting said platform to turn on said base and about an upright axis, and circumferentially extending slit means formed in said ring and opening vertically therefrom to enable said ring to conform to said grooves.

9. A pedestal as defined in claim 8 in which said slit means comprise angularly spaced slits formed in said ring.

10. A pedestal as defined in claim 9 in which said slits open upwardly from said ring.

11. A pedestal as defined in claim 10 in which said slits extend axially through said ring.

12. A pedestal as defined in claims 9, 10 or 11 in which said ring is defined by angularly spaced first sections having a cross-sectional diameter corresponding substantially to the cross-sectional diameter of said bearing race, said slits being formed in said first sections, said ring further being defined by intervening second sections having a cross-sectional diameter which is substantially less than the cross-sectional diameter of said first sections.

13. A pedestal as defined in claim 12 in which said ring is radially split.

* * * * *